United States Patent
Koslover et al.

(10) Patent No.: US 7,166,927 B2
(45) Date of Patent: Jan. 23, 2007

(54) MODULAR LIQUID-METAL MAGNETOHYDRODYNAMIC (LMMHD) POWER GENERATION CELL

(75) Inventors: Robert A. Koslover, Tustin, CA (US); Raymond C. Law, Anaheim, CA (US)

(73) Assignee: Scientific Applications & Research Associates, Inc., Cypress, CA (US)

( * ) Notice: Subject to any disclaimer, the term of this patent is extended or adjusted under 35 U.S.C. 154(b) by 7 days.

(21) Appl. No.: 11/029,828

(22) Filed: Jan. 5, 2005

(65) Prior Publication Data

US 2005/0146140 A1    Jul. 7, 2005

Related U.S. Application Data

(60) Provisional application No. 60/534,072, filed on Jan. 5, 2004.

(51) Int. Cl.
*H02K 44/00* (2006.01)
(52) U.S. Cl. .................................... 290/1 R; 310/11
(58) Field of Classification Search ................ None
See application file for complete search history.

(56) References Cited

U.S. PATENT DOCUMENTS

| | | | | |
|---|---|---|---|---|
| 2,897,650 A | * | 8/1959 | Carlson, Jr. et al. | 60/326 |
| 3,345,523 A | * | 10/1967 | Grunwald | 310/11 |
| 3,399,315 A | * | 8/1968 | Powell, Jr. | 310/11 |
| 3,878,410 A | * | 4/1975 | Petrick et al. | 310/11 |
| 4,151,423 A | | 4/1979 | Hendel | |
| 4,180,752 A | * | 12/1979 | Gorlin et al. | 310/11 |
| 4,200,815 A | | 4/1980 | Petrick et al. | |
| 4,218,629 A | * | 8/1980 | Kayukawa et al. | 310/11 |
| 4,359,706 A | * | 11/1982 | Flack | 335/281 |
| 4,388,542 A | | 6/1983 | Lee et al. | |
| 4,785,209 A | * | 11/1988 | Sainsbury | 310/11 |
| 5,136,173 A | | 8/1992 | Rynne | |
| 5,614,773 A | | 3/1997 | Fabris | |
| 5,637,934 A | * | 6/1997 | Fabris | 310/11 |
| 5,923,104 A | | 7/1999 | Haaland et al. | |
| 6,310,406 B1 | | 10/2001 | Van Berkel | |
| 6,916,565 B1 | * | 7/2005 | Shioya | 429/19 |

* cited by examiner

*Primary Examiner*—Joseph Waks
(74) *Attorney, Agent, or Firm*—Stetina Brunda Garred & Brucker

(57) ABSTRACT

A LMMHD power generation cell, having a fluid channel in which a conductive fluid is forced to flow in response to an external force. A pair of pressure conveying members such as bellow reservoirs can be used for conveying the external force to the conductive flow. A magnetic field is established across the fluid channel by a pair of magnets. A pair of electrodes is disposed with respect to the fluid channel to collect the electric current induced by the conductive fluid flowing through the magnetic field. The magnets are selected from either permanent magnets or electromagnets. Preferably, the conductive fluid is selected from low-density, low-viscosity, high-conductivity liquid metal such as NaK-78.

30 Claims, 9 Drawing Sheets
(5 of 9 Drawing Sheet(s) Filed in Color)

MODULAR LIQUID-METAL MAGNETOHYDRODYNAMIC (LMMHD) POWER GENERATION CELL

This application claims priority to Provisional Patent Application Ser. No. 60/534,072, filed Jan. 5, 2004, entitled MODULAR LIQUID METAL MHD POWER GENERATION CELL, the teachings of which are expressly incorporated herein by reference.

BACKGROUND OF THE INVENTION

The present invention relates in general to a modular liquid-metal magneto-hydrodynamic (LMMHD) power generation cell, and more particularly, to a LMMHD power generation cell that converts an applied mechanical power supplied by very strong, but slow moving forces such as ocean waves, into usable electric power.

The ocean waves have historically been considered a potential source of useful energy. Numerous attempts and researches have been made to extract power from ocean waves. For example, a seawater-based magneto-hydrodynamic (MHD) generator for generating electricity from the heave motion of ocean waves has been proposed and described in U.S. Pat. No. 5,136,173. The MHD generator includes a power generator placed well below the ocean surface and connected to a bobbing surface float via a rigid rod. The motion of the seawater across an applied magnetic field produces electricity. An advantage for such an approach is that there are no moving parts, or at least, not any part moved relative to the main body of the power generator. However, as the seawater used as the MHD interaction fluid is not nearly conductive enough to generate any reasonably-attainable magnetic field strengths, inefficiency becomes a major problem of the generator.

BRIEF SUMMARY OF THE INVENTION

A liquid-metal magneto-hydrodynamic (LMMHD) power generation cell is provided to facilitate efficient, practical, and economical conversion of applied mechanical power supplied in the form of very strong, but slow moving forces such as ocean waves, into usable electric power. The LMMHD power generation cell couples forces available from ocean waves to a liquid-metal working fluid inside a generator to result in generated electric power/volume approximately six orders of magnitude greater than that using seawater as the interacting fluid.

In one embodiment, the LMMHD power generation cell comprises a fluid channel in which a conductive fluid is forced to flow in response to an external force. A pair of pressure conveying members such as bellow reservoirs can be used for conveying the external force to the conductive flow. A magnetic field is established across the fluid channel by a pair of magnets. A pair of electrodes is disposed perpendicularly to both the magnetic field and the fluid channel for collecting the electric current induced by the conductive fluid flowing through the magnetic field. The magnets include either permanent magnets or electromagnets. The conductive fluid includes low-density, low-viscosity, high-conductivity liquid metal such as NaK-78.

To resolve the power losses caused by end electromagnetic effects, each of the magnets has a tapered side surface adjacent to the fluid channel, such that a tapered magnetic field is established. In addition, the ends of the fluid channel are also tapered from two sides of the electrodes. The power generation cell further comprises a pair of yokes holding the magnets at two sides of the fluid channel. Preferably, the yokes are fabricated from magnetic steel. To suppress magnetic saturation, a magnet gap is formed in each yoke. More specifically, each of the yokes preferably includes two symmetric magnetic members joined with each other by a non-magnetic separator.

A power generator is constructed by connecting a plurality of the liquid-metal magneto-hydrodynamic power generation cells in series. An external conveying mechanism is employed for conveying an external force to the liquid metal within each power generation cell. The external conveying mechanism includes a pair of chambers filled with hydraulic oil. The pressure conveying members of the power generation cells are enclosed in the respective chambers. A pair of pistons is connected to the respective chambers to pressurize the hydraulic oil, so as to generate the flow of the liquid metal within the fluid channels.

BRIEF DESCRIPTION OF THE DRAWINGS

The patent application file contains at least one drawing executed in color. Copies of this patent with color drawings will be provided by the Patent and Trademark Office upon request and payment of necessary fee.

These as well as other features of the present invention will become more apparent upon reference to the drawings therein.

DETAILED DESCRIPTION OF THE INVENTION

Figure 1:
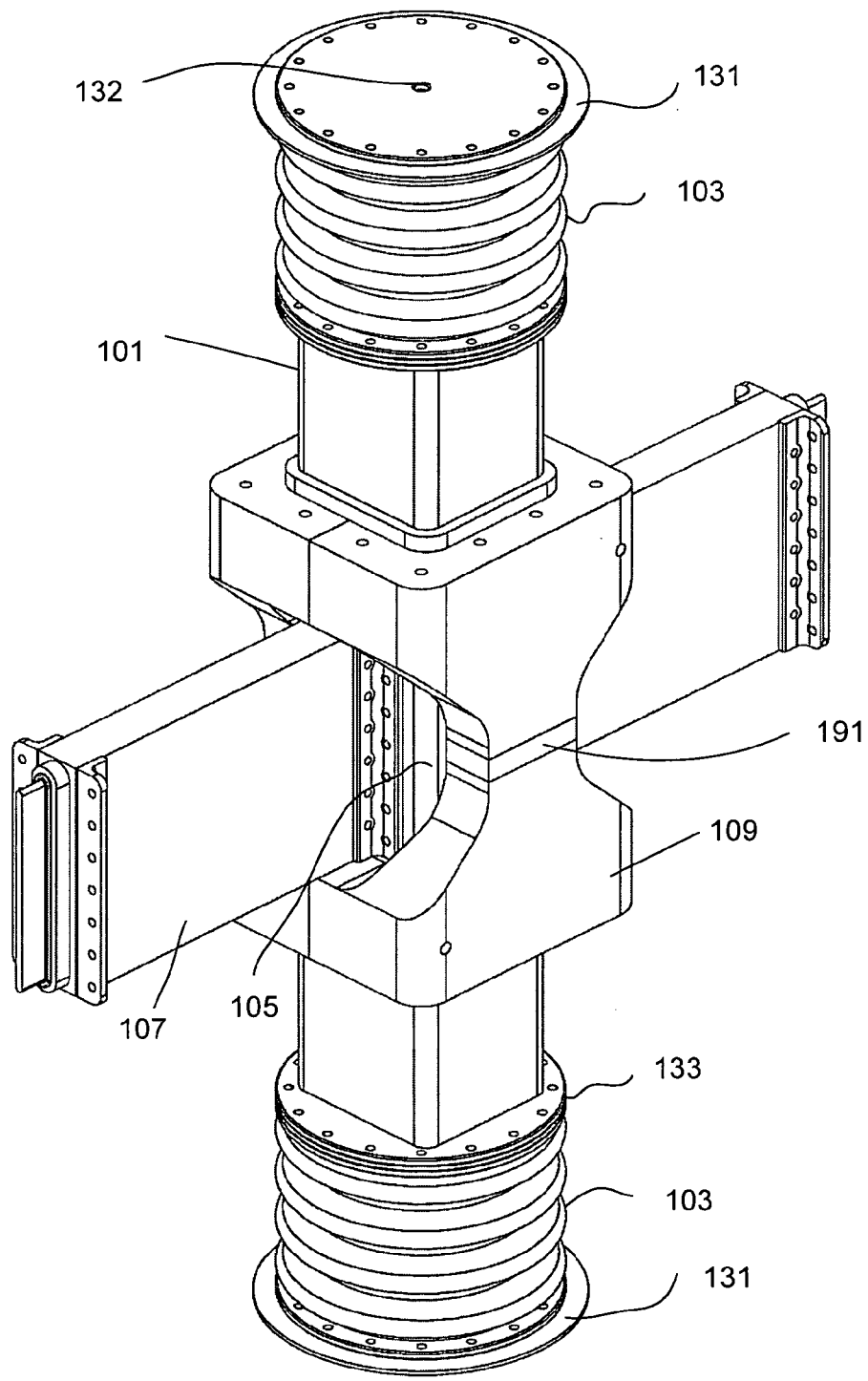
FIG. 1 is a perspective view of a modular liquid-metal magneto-hydrodynamic (LMMHD) power generation cell.

Referring now to the drawings wherein the showings are for purpose of illustrating preferred embodiments of the present invention only, and not for purposes of limiting the same, FIG. 1 illustrates a modular liquid-metal magneto-hydrodynamic power generation cell (LMMHD) for facilitating efficient, practical and economical conversion of applied mechanical power supplied in the form of very strong, but slow-moving forces into usable electrical power. The LMMHD power generation cell includes a fluid chamber 101 and a pair of pressure conveying members such as bellow reservoirs 103 coupled to two opposing ends of the fluid chamber 101 via a pair of coupling members 133. Each of the bellow reservoirs 103 is covered by an end cap 131, extending through which is a hole 132 for introducing a fluid into the fluid chamber 101. The holes 132 are sealed after the fluid is introduced into the fluid chamber 101. When an external force is applied, the bellow reservoirs 103 are compressed to convey the external force to the conductive liquid, so as to force the fluid flowing within the fluid chamber 101. A pair of magnets 105 is provided for establishing a magnetic field across the flow of the fluid, so as to induce an electric current when the fluid flows through the magnetic field. Preferably, the magnets 105 include permanent magnets such as high-grade sintered NdFeB. It will be appreciated that the magnetic field can also be provided by electromagnets as desired. The induced electric current can be intercepted and collected by a pair of electrodes 107 and made available to drive an external load.

The basic interactions between the forced flowing fluid, the applied magnetic field and the generated electric current are determined by established principles of magneto-hydrodynamics, which themselves follow basic classical electromagnetic principles, specifically Faraday's Law of Induction: $\nabla \times \vec{E} = -\partial \vec{B}/\partial t$ and the Lorentz Force Law: $\vec{F}_q = q(\vec{E} + \vec{v} \times \vec{B})$, where $\vec{E}$ is the generated electric field, and $\vec{B}$ is the applied magnetic field, and $\vec{v}$ is the speed of the fluid flow.

Before explaining how the LMMHD power generation cell as shown in FIG. 1 works, an ideal MHD cell is discussed first. In the ideal MHD cell, an applied magnetic field $\vec{B}$ is taken as uniform and constant across a rectangular interaction space with thickness d between the surfaces of two attracting magnets, width w between two electrodes, and length L along the fluid flow direction, carrying a frictionless fluid of conductivity σ driven at a uniform and constant speed v through the cell. The electrodes are supposed connected together through an external load $R_L$. By ignoring all end-losses, all fluid frictional or kinematic losses, and all perturbations to the magnetic fields due to the current generated, the following parameters can be expressed as:

a. Open-circuit voltage without a load: $V_{oc} = Bvw$;
b. Internal Ohmic resistance of the cell $R_C$:

$$R_C = \frac{w}{\sigma L d};$$

c. Voltage $V_L$ delivered to a load $R_L$:

$$V_L = V_{oc} \frac{R_L}{R_L + R_C}$$

d. Current $I_L$ delivered to the load:

$$I_L = \frac{V_L}{R_L} = \frac{V_{oc}}{R_L + R_C}$$

e. Power $P_L$ delivered to the load:

$$P_L = V_L I_L = \sigma v^2 B^2 w L d \frac{R_L R_C}{(R_L + R_C)^2}$$

f. Power $P_C$ consumed in cell Ohmic heating:

$$P_C = I_L^2 R_C = \sigma v^2 B^2 w L d \frac{R_C^2}{(R_L + R_C)^2}$$

Based on the above relationships, the ideal power conversion efficiency can be obtained as:

$$\eta_{ideal} = \frac{P_L}{P_L + P_C} = \frac{R_L}{R_L + R_C}.$$

It is known that in any actual MHD cell, the achieved power conversion efficiency is often much less than the ideal power conversion efficiency, that is, $\eta < \eta_{ideal}$. Nevertheless, continuing the ideal analyses, the maximum deliverable power to the load occurs under matched load conditions, that is, $R_L = R_C$. The maximum power can thus be derived from:

$$P_{max} = \frac{1}{4} \sigma v^2 B^2 w L d,$$

with the power conversion efficiency (at $P = P_{max}$) equal to 50% (In most cases, one would choose to operate at $R_L > R_C$ to achieve higher efficiency).

The above expressions reveal the scaling relationships for the most basic MHD parameters within the limit of the ideal model. For example, the generated electric power to the load is proportional to the fluid conductivity σ, the square of the fluid speed $v^2$, the square of the magnetic field $B^2$, and the volume wLd of the cell. It is for this reason that seawater with a conductivity of about 4 S/m represents a poor choice of working fluid compared to materials such as eutectic liquid-metal alloy of sodium and potassium known as NaK-78, of which the conductivity is about $2.63 \times 10^6$ S/m. Therefore, an ideal NaK-filled MHD cell should produce about 650,000 times the output power of the identical seawater-filled MHD cell. Since the capital cost of generating strong magnetic fields is approximately proportional to the volume of field required, economic considerations alone lead one to consider liquid metal as the working fluid.

The expressions above are only true to the extent that idealizations asserted earlier are valid. In a more complete analysis, most of the above parameters must be modified due to: (1) perturbation of the applied magnetic field by fields from the MHD-generated current; (2) fluid frictional and kinematic losses; and (3) two types of cell "end-effects", which in many cases represent the most serious sources of wasted power (and thus reduced efficiency). In general, these effects act to reduce both the available output power and the power conversion efficiency.

The extent to which the applied magnetic field within the main body of the MHD cell (not including end effects) tends to become distorted by the induced MHD currents can be estimated from the Magnetic Reynolds Number $R_m = \mu_0 v \sigma d$ for a cell of thickness d. As $R_m$ increases to unity or larger, the fluid begins to literally expel the magnetic field from within it, thereby thwarting the basic MHD power generation mechanism. The expression of the Magnetic Reynolds Number can be referred to "*The Electromagneto-dynamics of Fluids*" by W. F. Hughes and F. J. Young, Kreiger Publishing Co., Malabar, Fla. 1989.

Fortunately, even with very highly-conductive fluids such as liquid metals, keeping $R_m$ relatively small is fairly easy to do, provided that the fluid speed v is not too extreme and the cell thickness d is not too large. More specific details of the perturbations to the applied field are calculated via numerical models of specific configurations.

The direct fluid friction power losses may be computed via:

$$P_{\text{fluid\_friction\_loss}} = \frac{1}{2}\rho_m v^3 A_c \left(\frac{L_{\text{eff}}}{h_{\text{eff}}}\right) f,$$

where $\rho_m$ is the fluid mass density, v is the fluid speed in the cell, $A_c$ is the cross-sectional area of the channel (aka, the cell), $L_{\text{eff}}$ is the effective length of the channel, $h_{\text{eff}}$ is the equivalent circular diameter of the channel, and f is an empirical tabulated factor depending upon $h_{\text{eff}}$ and the ordinary fluid Reynolds number $R_e$ associated with the flow. The expression of direct fluid friction power loss $P_{\text{fluid\_friction\_loss}}$ is adapted from "*Flow of Fluids Through Valves, Fitting, and Pipes*" by Crane Technical Paper No.410 (TP-410), available from the website http://www.cranevalves.com/tech.html of the Crane Valve Group. Lower viscosity fluids yield higher value of $R_e$ and smaller values f. For cases of interest here, $R_e$ is about $10^5$ or more, which implies a fully-mixed and turbulent fluid flow. In such a case, the flow rate v becomes essentially independent of location in any cross-section of the interaction region of the cell, which is a desirable situation for efficient MHD power generation.

In contrast, fluid kinematic power losses arise via a different mechanism, including the acceleration of the fluid out of the entrance reservoir so as to pass through the interaction region of the cell at speed v, to be followed by exiting and suffering an inelastic collision with the rest of the fluid piling up in the exit reservoir. The kinetic energy that must be provided to the fluid in this process is thereby lost into heat. The kinetic energy lost per unit time is the kinematic power loss, which may be computed from:

$$P_{\text{kinematic\_loss}} = \frac{1}{2}\rho_m v^3 A_c \left(1 - \frac{v_{\text{drive}}^2}{v^2}\right),$$

where $v_{\text{drive}}$ is the initial speed of the driving fluid external to the cell. For most circumstances of interest here, $v_{\text{drive}} \ll v$, so the term in parentheses of the equation directly above is about 1.

According to the above, both the kinematic and frictional power losses are linearly proportional to the fluid mass density $\rho_m$, while the useable MHD power generated within the cell is independent of $\rho_m$. This means that lower mass density fluid yields more efficient MHD power generation. In addition, both kinematic and direct frictional power losses are directly proportional to the cube of the fluid speed, while the useable MHD power generated by the cell is roughly proportional to the square of the fluid speed. This implies that although the electric power generated increases quadratically with fluid speed, the efficiency of this process begins to fall rapidly with v, once the speed is increased to a value high enough for the frictional and kinematic loss terms to become significant. The lower the density of the fluid, the higher this threshold speed will be, and thus the greater power can be efficiently produced from an MHD cell of any given size.

As understood, there exist serious power losses due to electromagnetic effects that occur at the entrance and exit of the cell. These end losses are divided into two categories, including:

a. closed-loop circulating electric current (aka "eddy-current") induced in and confined to fluid, due to gradient in the magnetic fields at each end of the MHD cell; and b. undesirable return-path currents, also occurring at each end of the cell, which act to close the circuit between the electrodes via paths through the fluid, rather than across an external load.

Figure 2:
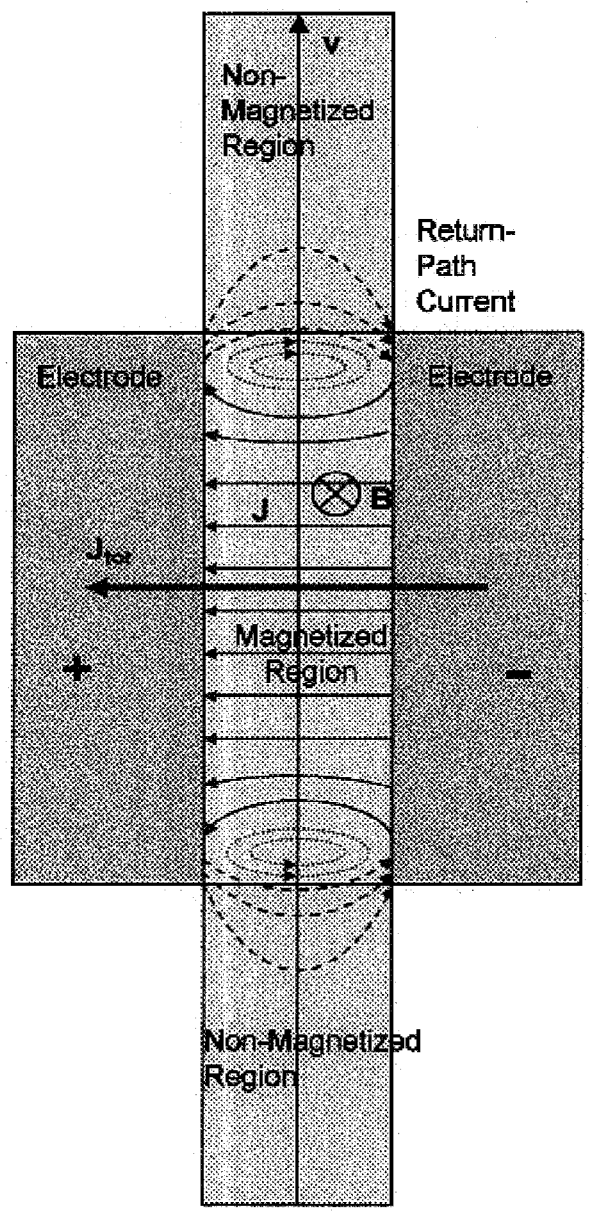
FIG. 2 is a cross-sectional view for a conventional design of flow channel of the liquid-metal magneto-hydrodynamic power generation cell.

In most geometries, the second of these two end effects represents the more serious power loss mechanism. FIG. 2 shows the cross-sectional view of a conventional design for a fluid channel of a MHD cell, of which these two types of end losses together often consume so much power that very low efficiency operation results. As shown, the remaining induced circulating electric currents associated with the end magnetic fields are centered at the ends of the cell, reinforcing the return-path currents and suppressing the useful current there. The conventional approach to minimizing these losses is to build the MHD cells with very large length to width ratios (e.g., 10:1 or more), so as to reduce the ratio of the power lost at the ends to power generated within the main body of the cell. Unfortunately, lengthening an MHD cell reduces its already very low-impedance, thus making extraction of its power in usable electrical form more difficult. Another established approach to battling end losses is to introduce insulating vanes parallel to the fluid flow, to try to block the undesirable circulating and return-path currents. However, these are only effective in practice if the vanes are made very long, and this introduces substantial direct fluid-friction power losses, which once again results in reduced power conversion efficiency.

To more effectively resolve the end electromagnetic effects, in one embodiment, a combination of tapering in both the magnetic field strength and the fluid flow geometry is provided to result in a near cancellation of the most serious power loss mechanisms associated with the end-loss currents noted above. The tapered magnetic field is depicted in the exploded view of the LMMHD generation cell as shown in FIG. 3, and the tapered flow geometry can be referred to the cutaway views of the LMMHD generation cell as shown in FIGS. 4 and 5.

Figure 3:
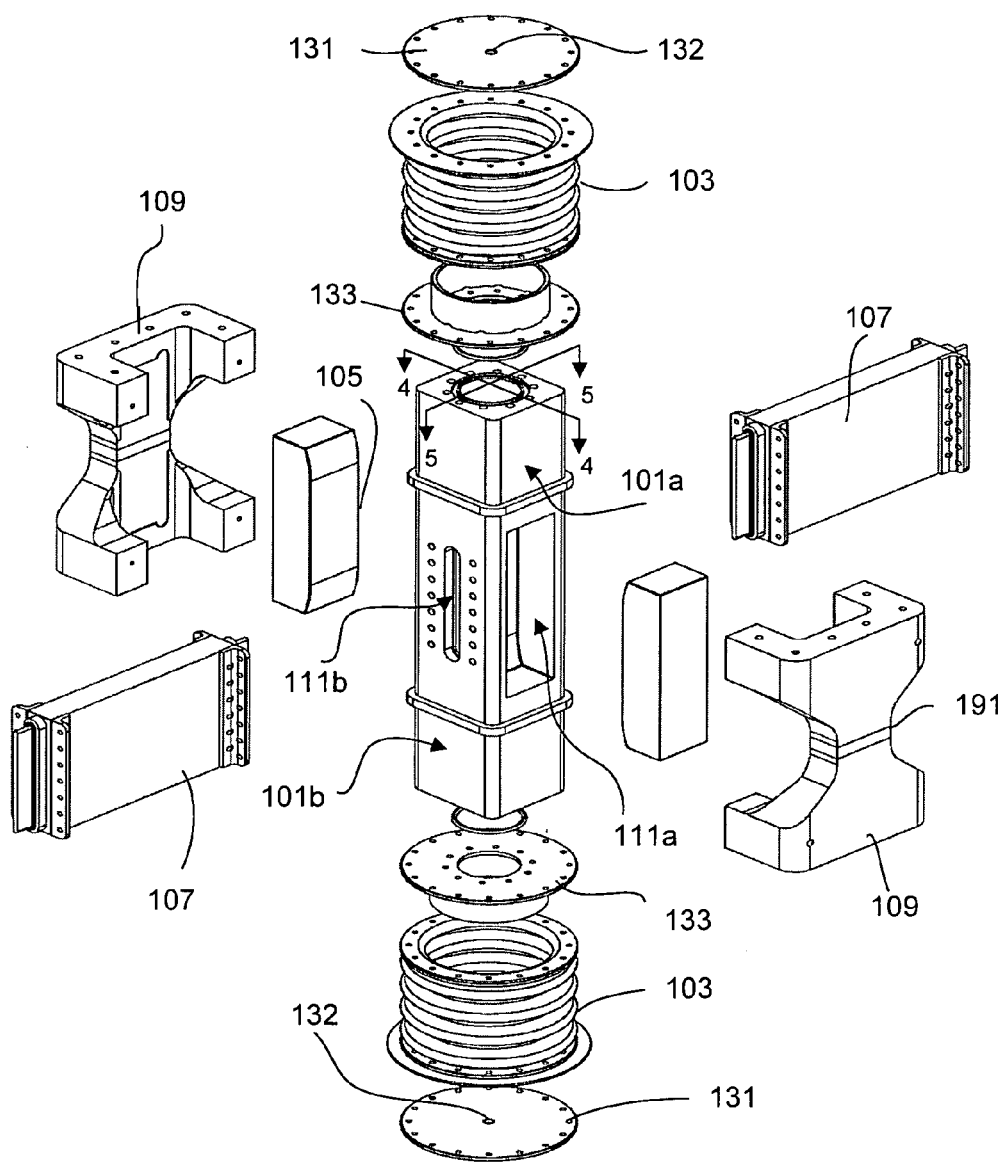
FIG. 3 is an exploded view of a LMMHD power generation cell.

As shown in FIG. 3, the fluid chamber 101 is in the form of a rectangular shell having a first pair of sidewalls 101a perforated with windows 111a for embedding the magnets 105 therein and a second pair of sidewalls 101b perforated with windows 111b for installing the electrodes 107. As shown, the internal edges of each window 111a are tapered, and the magnets 105 conformal to the windows 111a thus have tapered inner side surfaces to result in a tapered magnetic field perpendicular to the fluid flow. The magnets 105 are held and enclosed by a pair of magnetic steel yokes 109.

Figure 4:
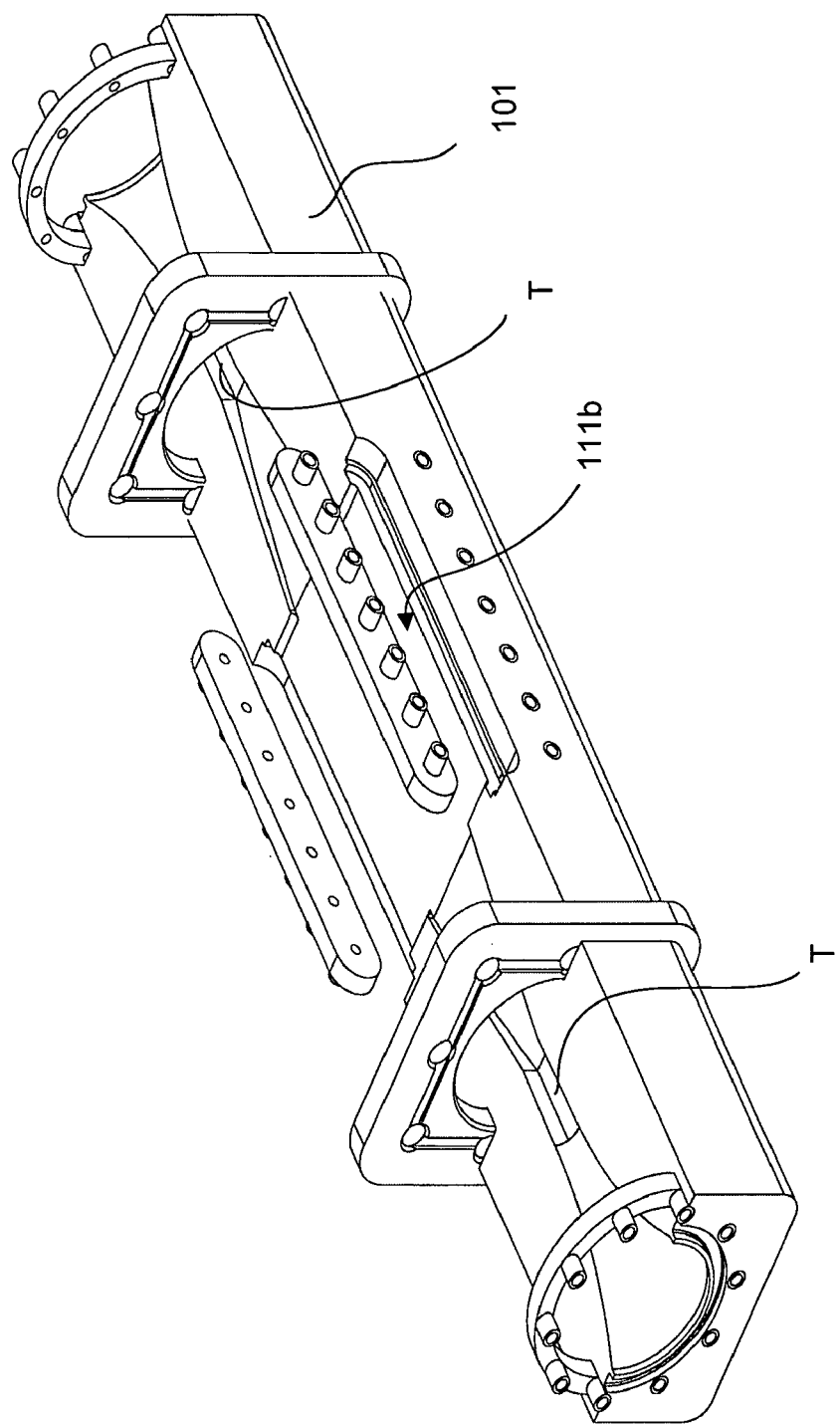
FIG. 4 is a cutaway view of the LMMHD power generation cell as shown in FIG. 3.
Figure 5:
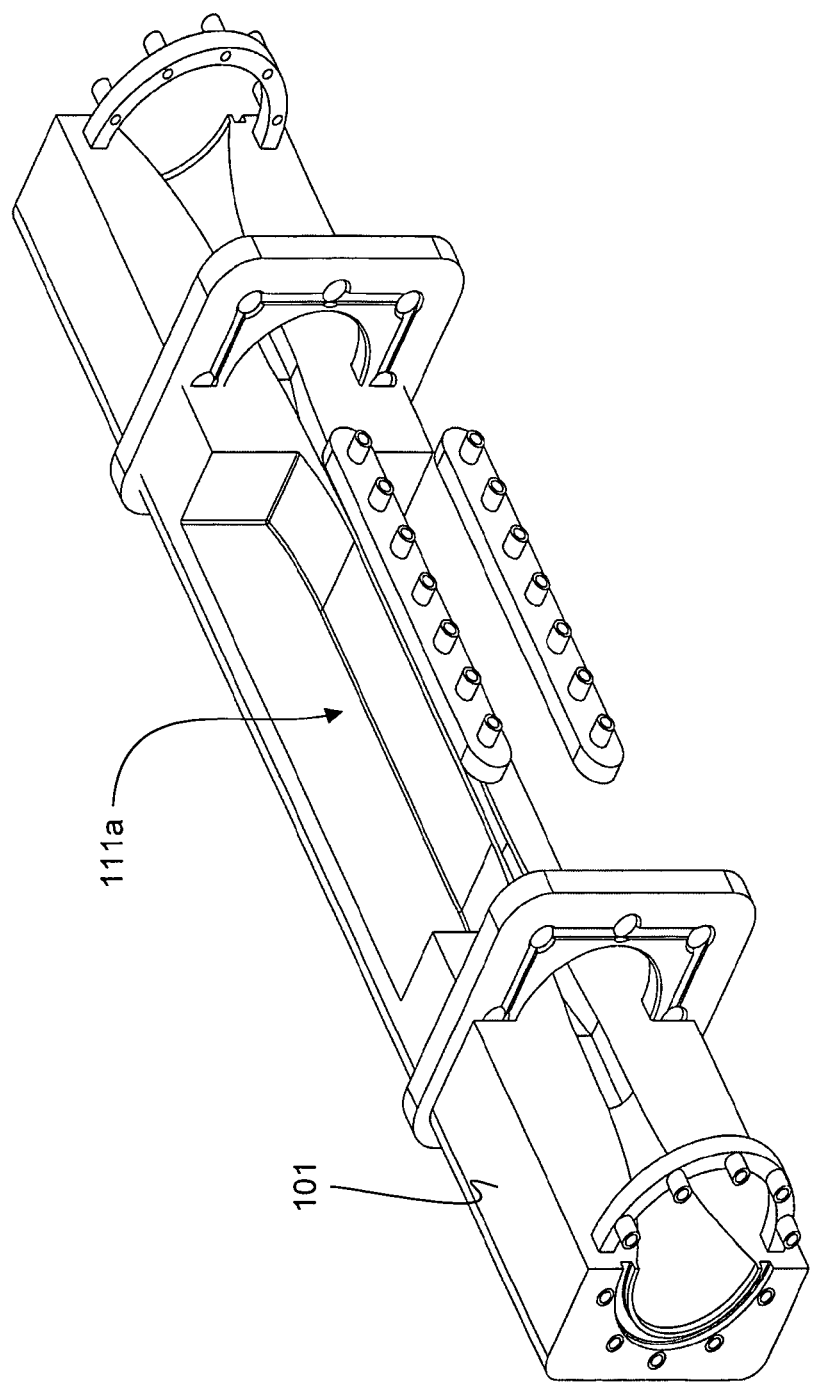
FIG. 5 is another cutaway view of the LMMHD power generation cell as shown in FIG. 3.
Figure 6:
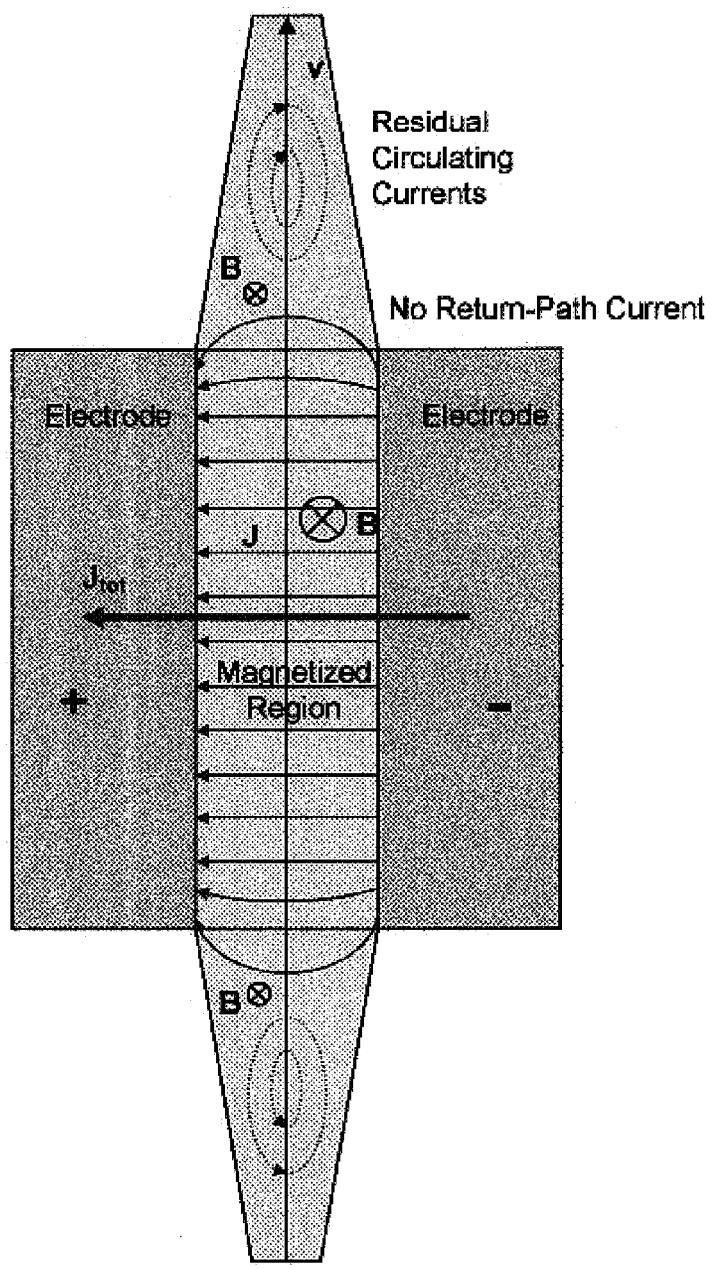
FIG. 6 is a cross-sectional view for a tapered flow channel of the LMMHD power generation cell.

The geometry of the fluid channel within the fluid chamber 101 is further illustrated in FIGS. 4 and 5 cutting away from lines 4—4 and 5—5. As shown, the internal surface of the fluid chamber 101 is gradually contracted from both ends of the magnets 105, that is, from both ends of the electrodes 107 towards the turning points T. Thereby, tapered flow geometries are formed at two ends of the electrodes 107. The internal surface of the fluid chamber 101 is then gradually widened from the turning points T towards the ends coupled to the bellow reservoirs 103. FIG. 6 is a cross sectional view of the tapered fluid channel at both ends of the electrodes 107. As shown, the tapered magnetic field at both ends of the electrodes 107 pushes the remaining induced circulating electric currents associated with the end electromagnetic effect well away from the ends of the electrodes 107. These remaining induced circulating electric currents are further confined by the narrow width of the tapered fluid channel. Meanwhile, the undesirable return-path currents driven by the induced generated electrode potentials which would flow opposite to those in the primary interaction region of the power generation cell have been completely suppressed. Therefore, the combined tapering of the magnetic field and the fluid flow results in nearly all of the current at the ends of the cell (1) flowing in the same direction as desirable $v \times \mu$-driven current; and (2) connecting to the electrodes and useful in driving an external load. By employing this end-loss suppression technique, high efficiency operation with a relatively small length-to-width ratio can be achieved.

When the fluid is not flowing, the magnetic field in the cell is symmetric and balanced, in the sense that the upper and lower sections of the yoke carry equal amounts of magnetic flux. However, when the fluid is forced through the cell, the induced electric currents in both the cell and in the external electrodes generate another component to the magnetic field, with field lines looping around this induced electric current. This magnetic field then couples into the magnetic yokes 109, unbalancing the yoke magnetic field distribution. Such an imbalance is undesirable, not only because it reduces the uniformity of the magnetic in the MHD interaction region, but because it can drive sections of the magnetic yoke material into magnetic saturation. Therefore, in this embodiment, a magnetic gap is formed within each yoke 109. That is, as shown in FIGS. 1 and 3, each of the yokes 109 includes two symmetric magnetic steel members joined with each other by a non-magnetic separator 191.

Figure 7:
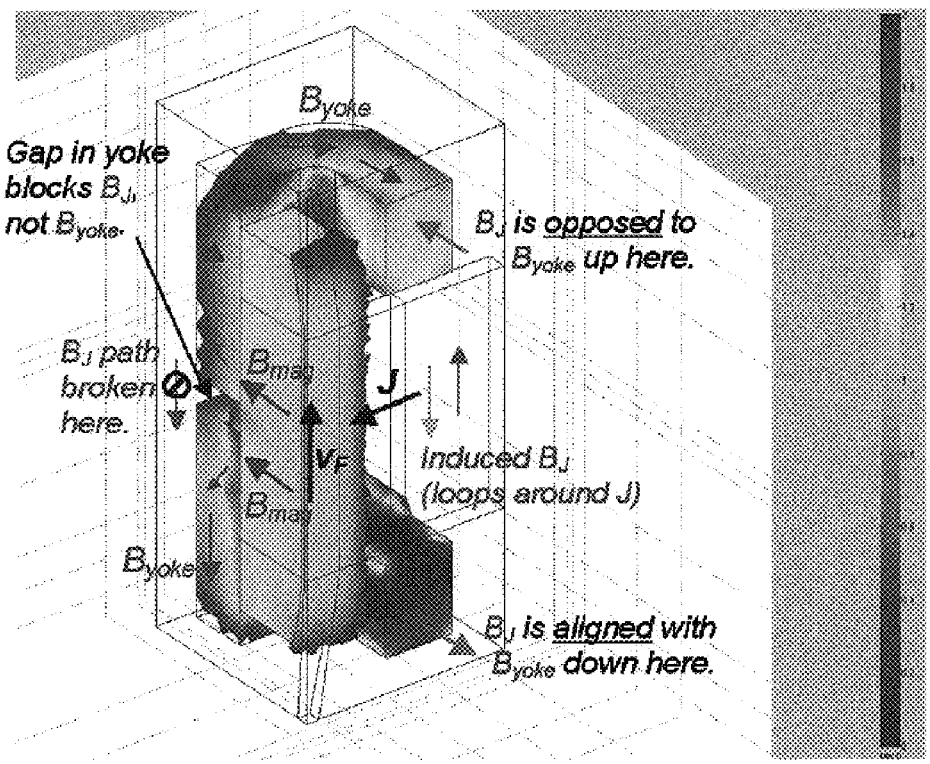
FIG. 7 is a finite-element model of yoke and magnet B fields in the presence of MHD-induced currents.

Magnetic saturation is the tendency of the magnetic permeability of the material to decrease towards unity, which allows the magnetic field lines to leak out of the material and degrade the integrity of the magnetic circuit overall. High-quality magnetic iron, for example, very low carbon steel such as type 1010 steel tends to saturate at a magnetic field of about 2.2 Tesla. FIG. 7 shows a closer look at regions of the yoke 109 with magnetic field strengths lying between 2.0 T and 2.5 T, for a modeled yoke of an operating MHD cell. Comparison of the finite-element simulations with and without magnetic gaps shows that these gaps reduce the extent and severity of the induced magnetic saturation, thus helping to preserve a strong and uniform magnetic field within the MHD interaction region during operation.

Figure 8:
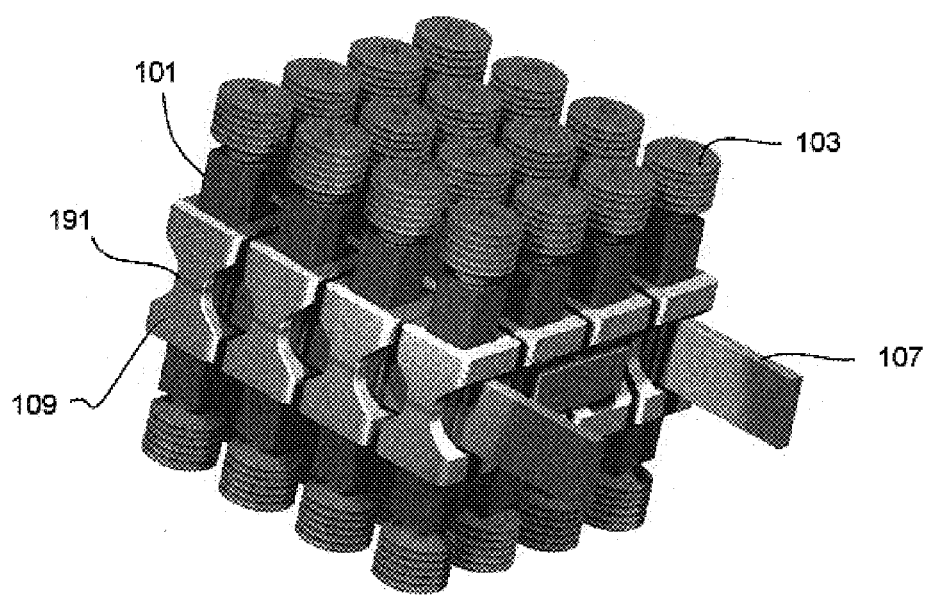
FIG. 8 shows an array of LMMHD power generation cells for forming a generator.
Figure 9:
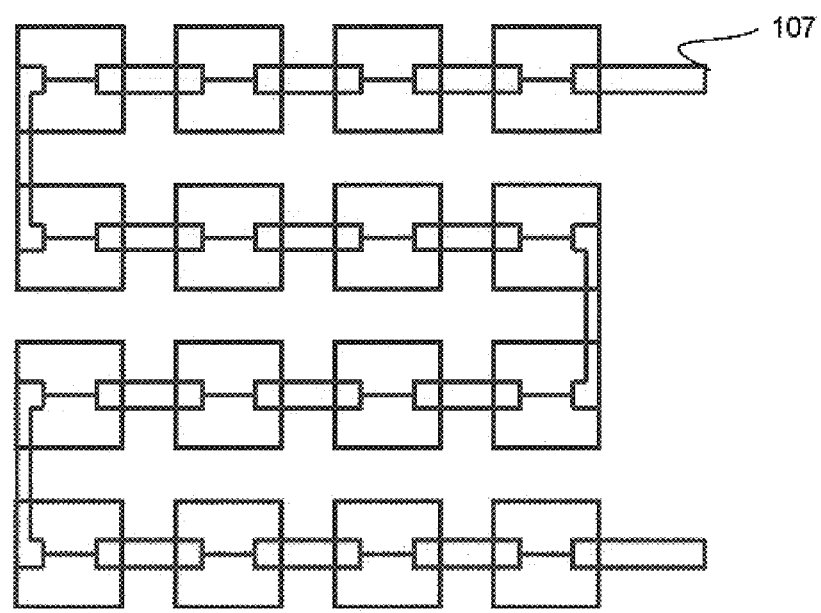
FIG. 9 shows the serial connection of the LMMHD power generation cells of the array as shown in FIG. 8.

To produce higher voltages and power output, the LMMHD cells as shown in FIG. 1 can be incorporated into a series-electrical array as shown in FIG. 8, and the serial connection between the LMMHD cells is illustrated in FIG. 9.

As mentioned above, to achieve the highest efficiency in conversion of applied mechanical power into electrical power, the liquid metal employed in the LMMHD cell should be low-density, low-viscosity and a very good electrical conductor. Unfortunately, very few metals are liquid at or near room temperature, and most of them are of very high density such as mercury. A liquid metal with vastly better properties from an MHD perspective is NaK-78, a eutectic alloy of sodium and potassium. It is also very inexpensive. However, it is highly reactive with water and oxygen. The modular design of FIG. 1 facilitates the safe and practical isolation of this liquid metal to within the cell. The conveyance of force to each cell can then be accomplished using a non-hazardous and low cost hydraulic oil within a pressure vessel as will be illustrated in the exemplary generator as described below.

Figure 10:
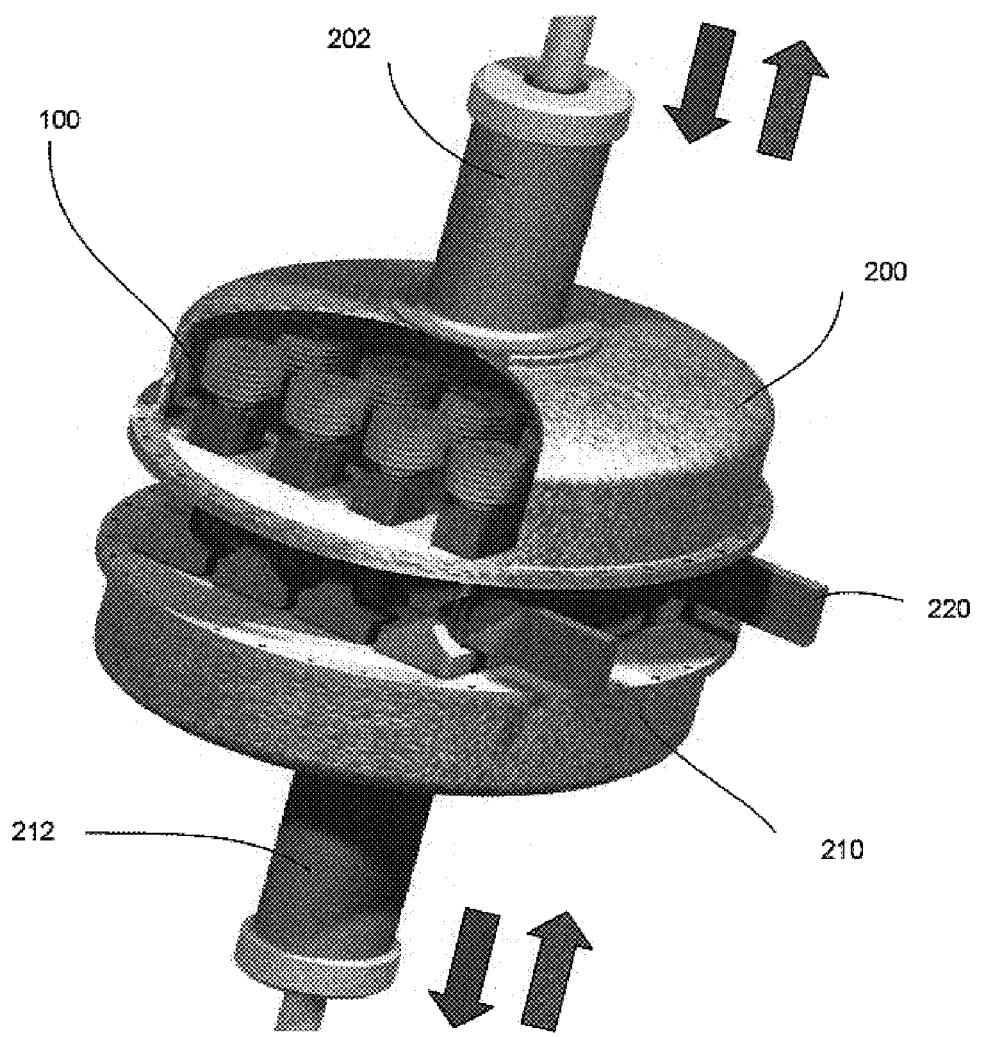
FIG. 10 shows a partially cutaway view of a power generator.

FIG. 10 shows a generator (a converter) comprising an array of 16 LMMHD cells 100 for converting mechanical power to electrical power. As shown, the upper bellow reservoirs 103 of the LMMHD cells 100 are enclosed in an upper chamber 200 connected to an upper piston 202, and the lower bellow reservoirs 103 of the LMMHD cells 100 are enclosed in a lower chamber 210 connected to a lower piston 212. The chambers 200 and 210 are filled with hydraulic oil. In operation, the pistons 202 and 212 are forced in and out, that is, the upper piston 202 goes in as the lower piston 212 goes out, then the lower piston 212 goes in as the upper piston 202 goes out. The in and out movement of the pistons 202 and 212 are repeated. The in and out movement of the pistons 202 and 212 pressurizes the hydraulic oil, which then compresses the bellows reservoirs 103 and forces the liquid metal flowing through the cell. The electric power is thus generated at the output terminal of the generator.

It will be appreciated that the 16-cell generator as shown in FIG. 10 can be made in a variety of scale sizes. However, it has been analyzed in detail that a generator with an overall scale-size of roughly 5 feet in diameter can obtain electrical power of about 125 KW from input mechanical power of 225 KW. Therefore, the mechanical-to-electrical conversion efficiency η is about 55%. The output electrical voltage and current are 10.2V and 12.2 KA, respectively.

The generator as shown in FIG. 10 represents just one configuration that should prove useful for the conversion to electricity of mechanical power provided to it as a very strong, but slow-moving, oscillatory mechanical force. An especially appropriate application of this kind of generator is the conversion to electricity of mechanical power provided by the heave motions of ocean waves.

Because of the relatively high-current, low-voltage output produced even when multiple modular LMMHD cells are connected in series, a local power converter is essential to up-convert to high voltages and low currents. Fortunately, modem solid-state switching power-inverter technologies are fully applicable to this task and can perform this function both efficiently and economically. For the case of an ocean wave energy converter employing an LMMHD array, local energy storage (rechargeable DC batteries, as fed by the generator) would be employed to act as a buffer to the generator power, thereby maintaining an approximately-constant DC input voltage to drive the aforementioned solid-state power inverter. Following the basic power-inversion process, a step-up transformer could be employed to convert this power to the high-voltage, low-current AC appropriate for power transmission to the seashore or another location.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A liquid-metal magneto-hydrodynamic power generation cell, comprising:
   a fluid channel;
   a conductive fluid sealed within the fluid channel and flowing along the fluid channel in response to an external force;
   a pair of magnets disposed at a first pair of opposing sides of the fluid channel, each of the magnets has a tapered side surface adjacent to the fluid channel; and
   a pair of electrodes disposed at a second pair of opposing sides of the fluid channel, the electrodes extending perpendicularly to a magnetic field generated by the magnets.

2. The power generation cell of claim 1, wherein the fluid channel includes two opposing ends tapered from two sides of each electrode.

3. The power generation cell of claim 1, further comprising a pair of bellow reservoirs coupled to two opposing ends of the fluid channel.

4. The power generation cell of claim 1, wherein the fluid channel is sealed within an insulating housing.

5. The power generation cell of claim 1, further comprising a pair of yoke for holding the magnets therein.

6. The power generation cell of claim 5, wherein each of the yoke includes two symmetric magnetic steel members joined with each other by a non-magnetic separator.

7. The power generation cell of claim 1, wherein the conductive fluid includes liquid metal having conductivity of about $2.63 \times 10^6$ S/m.

8. The power generation cell of claim 1, wherein the conductive fluid includes eutectic alloy of sodium and potassium, NaK.

9. The power generation cell of claim 1, wherein the magnets include permanent magnets.

10. The power generation cell of claim 9, wherein the magnets are fabricated from sintered NdFeB.

11. The power generation cell of claim 1, wherein the magnets include electromagnets.

12. A liquid-metal magneto-hydrodynamic power generation cell, comprising:
    a fluid channel, having two opposing tapered ends;
    a liquid metal flowing within the fluid channel in response to an external force;
    a pair of magnets positioned with respect to the fluid channel to provide a magnetic field perpendicular to the fluid channel between the tapered ends; and
    a pair of electrodes, positioned between the tapered ends for intercepting an electric current induced by flow of the liquid metal through the magnetic field.

13. The power generation cell of claim 12, further comprising a pair of pressure conveying members coupled to the tapered ends of the fluid channel.

14. The power generation cell of claim 12, further comprising a pair of yokes holding the magnets.

15. The power generation cell of claim 14, wherein each of the yoke includes a magnetic steel member and a non-magnetic gap partitioning the magnetic steel member into two symmetric parts.

16. A liquid-metal magneto-hydrodynamic power generation cell, comprising:
    a fluid channel;
    a liquid metal flowing within the fluid channel in response to an external force;
    a pair of magnets for generating a magnetic field perpendicular to flow of the liquid metal;
    a pair of electrodes for collecting an electric current induced by the liquid metal flowing through the magnets; and
    a pair of yokes holding the magnets around the fluid channel, each of the yokes comprising:
       a pair of symmetric magnetic steel portions; and
       a non-magnetic member connecting the symmetric magnetic steel portions.

17. The power generation cell of claim 16, further comprising a pair of bellow reservoirs coupled to two opposing ends of the fluid channel for conveying the external force to the liquid metal.

18. A power generator, comprising:
    an array of liquid-metal magneto-hydrodynamic power generation cells electrically connected in series, each of the power generation cells comprising:
       a fluid channel;
       a pair of internal pressure conveying members coupled to two ends of the fluid channel;
       a liquid metal sealed within the fluid channel, the liquid-metal flowing within the fluid channel in response to motion of the pressure conveying members;
       a pair of magnets for establishing a magnetic field perpendicular to flow direction of the liquid metal;:
       a pair of electrodes disposed perpendicular to both the flow direction and the magnetic field;
    a pair of external pressure conveying members communicating with the internal pressure conveying members at two ends of the fluid channel; and
    a pair of output terminals coupled to the electrodes.

19. The generator of claim 18, wherein the internal pressure conveying members include bellow reservoirs.

20. The generator of claim 18, wherein the liquid metal includes eutectic alloy of sodium and potassium, NaK-78.

21. The generator of claim 18, wherein the magnets include electromagnets.

22. The generator of claim 18, wherein the magnets include permanent magnets.

23. The generator of claim 18, wherein the fluid channel comprises two tapered ends at two sides of the electrodes.

24. The generator of claim 18, wherein each of the magnets has a tapered side surface adjacent to the fluid channel.

25. The generator of claim 18, wherein each power generation cell further comprises a pair of yokes holding the magnets.

26. The generator of claim 25, wherein the yokes are fabricated from magnetic steel.

27. The generator of claim 26, wherein each of the yokes includes two symmetric magnetic members and a non-magnetic member connecting the symmetric magnetic members together.

28. The generator of claim 18, wherein the external pressure conveying members include:
    a pair of chambers enclosing the internal conveying members therein;
    hydraulic oil filled in the chambers; and
    a pair of pistons connected to the chambers.

29. A method of increasing power efficiency of a liquid-metal magneto-hydrodynamic power generation cell, comprising:
    providing a tapered magnetic field perpendicular to a flow of liquid metal; providing a pair of electrodes for collecting an electric current induced by the flow of liquid metal through the tapered magnetic field; and tapering the flow of liquid metal at two opposing sides of the electrodes.

30. A method of suppressing magnetic saturation of a liquid-metal magneto-hydrodynamic power generation cell which comprises a fluid channel, a liquid metal flowing within the fluid channel, a pair of magnets providing a magnetic field perpendicular to the flow of the liquid metal, and a pair of magnetic yokes holding the magnets about the fluid channel, the method comprising:

using a non-magnetic material to partition each of the magnetic yokes into two symmetric magnetic portions.

* * * * *